Sept. 11, 1956 M. LEIFER 2,762,954

METHOD FOR ASSEMBLING TRANSISTORS

Filed Sept. 9, 1950

INVENTOR
MEYER LEIFER
BY Paul S. Martin
ATTORNEY

United States Patent Office 2,762,954

Patented Sept. 11, 1956

2,762,954

METHOD FOR ASSEMBLING TRANSISTORS

Meyer Leifer, Bayside, N. Y., assignor to Sylvania Electric Products Inc., a corporation of Massachusetts Application September 9, 1950, Serial No. 183,937

11 Claims. (Cl. 317—235)

The present invention relatese to semi-conductor translators and to methods of making them.

It is now known that amplification can be realized when a semi-conductor element is properly engaged by multiple small-area contacts or whiskers at closely adjacent points and with a large-area contact. The characteristics of such devices have in general not been of entirely satisfactory stability in units where both whiskers engage the same surface of the semi-conductor. In co-pending application Serial No. 41,785 filed July 31, 1948, by Harold Heins, now abandoned, an improved semi-conductor translator is shown having multiple point-contact elements engaging opposite surfaces of a slender wedge-formed semi-conductor body near its apex and an additional large-area contact on the body. Such device, while representing an improvement over the arrangement in which the point-contacts engage a single surface, involves certain manufacturing difficulties.

As will appear from the disclosure below of certain specific embodiments, the present invention provides a simplified procedure for manufacturing semi-conductor translators. The resulting translators represent a structural improvement over prior semi-conductor translators. In the illustrative disclosure semi-conductor bodies are formed with a septum or projection between accurately spaced reliefs in a semi-conductor body, or, more specifically, a rib formed by cutting equally deep accurately spaced grooves in the flat surface of a slab from which the semi-conductor body is taken. Point-contact elements are then pressed against opposite sides of the projection or the rib at the base thereof so as to be separated by a definite, predetermined spacing, and are located directly opposite each other at a common level fixed by the laterally extending surfaces or shoulders in the semi-conductor at the base of the projection or the rib. This simplifies manufacture and promotes uniformity among the units so constructed. The electrical interaction between the whiskers in this form of translator occurs within the body of the semi-conductor, and improved stability is thus provided which may be attributable to comparative immunity to surface deterioration.

Various additional features of the novel translators and their method of manufacture will be clear from the following detailed disclosure in which reference is made to the accompanying drawings.

Figure 1:
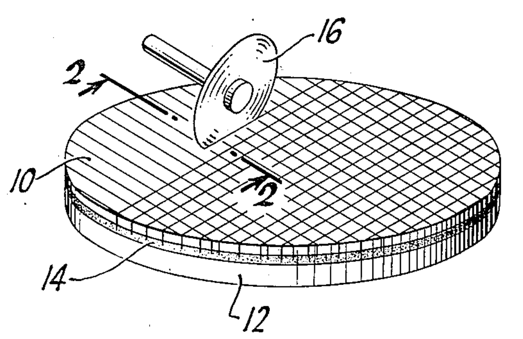
Fig. 1 is a perspective view of a diamond wheel shown in the process of cutting a slab of semi-conductor.

Referring now to Fig. 1 it is seen that a slab 10 of a suitable semi-conductive material, such as crystallized N-type germanium commonly used in germanium "point-contact" rectifiers, is adhered to a plate 12 as of brass by a layer 14 of pitch or the like. Diamond wheel 16 is used to make a large number of closely spaced parallel cuts in each of two mutually perpendicular directions in the hard, crystalline germanium, thereby producing dice such as those customarily used in semi-conductor diodes having a single whisker contacting one face of the body with a large-area contact joined to the opposite face of the body.

Figure 2:
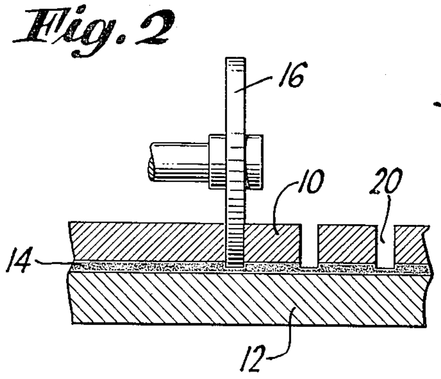
Fig. 2 is a greatly enlarged fragmentary view along the line 2—2 of Fig. 1 showing a first operation on the semi-conductor slab.

This operation is also illustrated in Fig. 2 where the step of forming the parallel cuts is shown in cross-section on a greatly enlarged scale. In Fig. 2 the dice of semi-conductor 10 are seen to be separated by grooves 20 but remain adhered in place, as by pitch 14.

Figure 3:
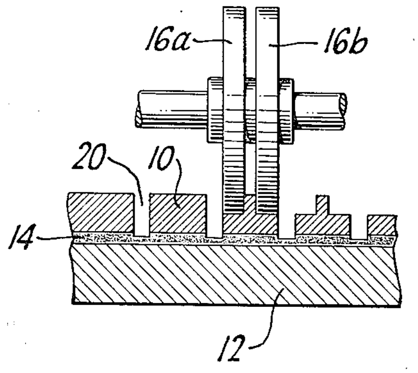
Fig. 3 is a view resembling Fig. 2, showing a further operation in preparing the semi-conductor elements.

In Fig. 3 a pair of diamond wheels 16*a*, 16*b* are shown cutting a pair of grooves to form shoulders extending to the edges left by parallel cuts 20. The rib thickness is determined by the spacing between the two diamond wheels, and is uniform throughout all the dice. Alternatively, the shoulders or grooves can be formed separately and successively by a single wheel 16, accurately stepping support 12 between cuts to produce comparable results. The spacing is automatically fixed however when multiple discs 16*a*, 16*b* are used. This spacing is a few thousandths of an inch, as is appropriate for the desired interaction between whiskers.

After the diamond-wheel cutting operations, the ribbed semi-conductor bodies are removed and carefully etched in a suitable reagent, a solution of HF, $H_2(NO)_3$ and cupric nitrate being used commonly for germanium.

Figure 4:
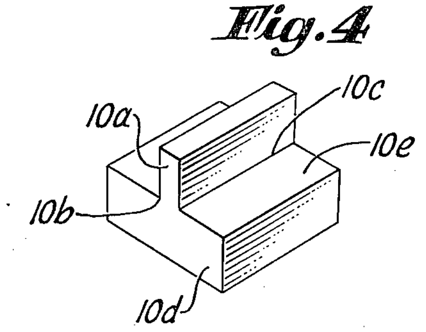
Fig. 4 is a greatly enlarged perspective view of the semi-conductor body resulting from the operations illustrated in Figs. 2 and 3.

The resulting semi-conductor body appears in Fig. 4, and includes a rib 10*a* projecting upward from a base portion 10*d* with parallel inside corners 10*b* and 10*c* located directly opposite each other in a plane 10*e* defined by the laterally extending shoulders or the top of base, and spaced from each other by a distance fixed by the thickness of rib 10*a*.

Semi-conductor body 10 is shown soldered on a metal plug 24 contained within a metal housing 26 having two tubular divergent projections 26*a* and 26*b*. Each of these contains a terminal or pin 28 that is fixed in place by a plug 30 of insulating material and each pin 28 carries a resilient whisker or point-contact element 32 that is held in pressure contact with semi-conductor element 10. The pressure can be regulated by adjusting the position of pin 28 in plug 30 within its tubular projection; but independent of the adjustment of pressure, the separation between the whiskers is predetermined and permanently fixed by the thickness of rib 10*a*. The whiskers and their supporting pins are arranged so that their axes lie in a plane perpendicular to shoulders 10*d*.

By providing aperture 26*c*, the whisker contact points can be inspected from above to make certain that they are substantially directly opposite each other; but their apposition in the plane 10*e* of the base portion 10*d* is assured by thrust toward inside corners 10*b* and 10*c*. Rib 10*a* determines the whisker spacing irrespective of where the whiskers are positioned along the rib. However, based on the consideration of isolation of the contacts from each other in respect to surface effects in this embodiment, the rib height should exceed its thickness, the length of the rib should be at least twice its height and the whiskers should be located midway along the rib.

Figure 5:
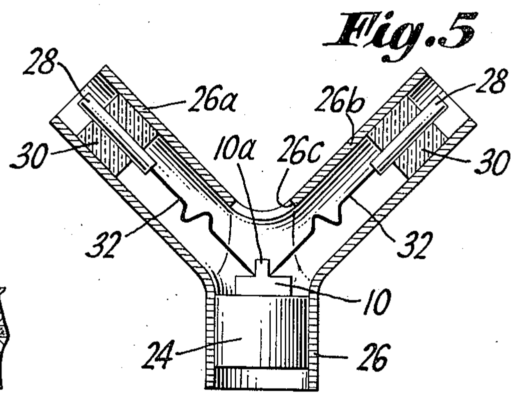
Fig. 5 is an enlarged cross-sectional view of a translator incorporating the semi-conductive body in Fig. 4.

The device in Fig. 5 is seen to represent a readily fabricated translator element in which the two whiskers produce an interaction within the body of the semi-conductor, in cooperation with the large area contact 24 and suitable circuit connections. Such device is useful for the various translating functions well known in the electrical art, most commonly for amplification.

Figure 6:
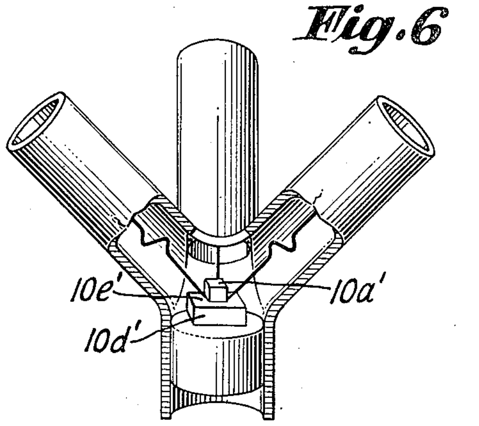
Fig. 6 is a broken-away perspective view of an additional embodiment.

In Fig. 6 another embodiment of the invention is illustrated employing more than the two whiskers in the embodiment of Fig. 5, Fig. 6 including three whiskers 32_a_, 32_b_, and 32_c_. The device in Fig. 6 also includes a base portion 10_d'_ affording shoulders 10_e'_ to each side of the projection 10_a'_, formed by parallel cuts as in Fig. 3; and another cut or pair of parallel cuts is then made at right angles to the first pair so as to provide a further inside corner in the plane 10_e'_. The advantage of relative immunity to surface deterioration of the embodiment in Figs. 4 and 5 is largely retained in Fig. 6. The feature of automatically controlled separation of the opposed contacts by the thickness of the projection, and orientation of the contacts in the plane of shoulders 10_e'_ are characteristic of this embodiment as of that in Fig. 5.

Varied applications of the invention disclosed, and modifications will be suggested by this disclosure, to those skilled in the art; and therefore the appended claims should be accorded a broad scope of interpretation, consistent with the spirit of the invention.

What is claimed is:

1. A semi-conductor translator including a body of semi-conductive material incorporating an upstanding rib between laterally extending surfaces on a base portion, there being a pair of inside corners where the rib joins said base portion, a large-area contact engaging said body, and a pair of whiskers engaging said rib from opposite sides and in said pair of inside corners respectively, said rib being sufficiently thin to enable interaction between said whiskers.

2. A semi-conductor translator including a germanium body, said body incorporating a parallel-sided rib between a pair of substantially co-planar shoulders, said rib and shoulders meeting in a pair of substantially parallel inside corners and a pair of contact whiskers pressed into said corners respectively and contacting direclty opposite points, the points of contact being close enough to each other to effect mutual interaction.

3. A semi-conductor translator including a body of N-type germanium having a base portion with substantially co-planar shoulders and a co-planar rib of a few thousandths of an inch in thickness joined to said base portion between said shoulders, a large-area contact on said base portion, and a pair of whiskers pressed respectively against the rib-shoulder junctions.

4. A semi-conductor translator including a body of N-type germanium having a base portion with substantially co-planar shoulders and a parallel-sided rib projecting from said base portion between said shoulders, the junction of said rib and said base portion affording two substantially parallel inside corners, a large-area contact on said body, and a pair of whiskers thrust into said corners at contacts directly opposite each other and midway along said rib.

5. In the method of manufacturing semi-conductor translators, the steps of adhering a slab of semi-conductive material to a support, forming ribbed elements of said slab by cutting paired grooves of substantially equal depth into the surface of said material opposite the adhered surface and by making crossed sets of parallel cuts through the slab while the material remains adhered to its support, and pressing separate contact whiskers toward each other and against the bottom of said grooves.

6. In the method of manufacturing semi-conductor translators, the steps of adhering a slab of semi-conductive material to a support, forming ribbed elements of said slab by cutting paired grooves of substantially equal depth into the surface of said material opposite the adhered surface and by making crossed sets of parallel cuts through the slab while the material remains adhered to its support, etching the surfaces formed by grooving, and pressing separate contact whiskers toward each other and against the bottom of said grooves.

7. The method of manufacturing multi-whisker semiconductor translators, including the steps of subdividing a slab of semi-conductive material into dice of uniform thickness, cutting reliefs of substantially equal depth and predetermined separation into a surface of each of said dice, and pressing a pair of whiskers into said reliefs along mutually approaching lines of thrust lying substantially in a common plane.

8. A semi-conductor translator having a semi-conductor body incorporating a projection of limited transverse dimension joined integrally to an otherwise flat base portion, the junction defining inside corners, a large-area contact supporting said body, and plural point-contacts engaging said corners at substantially opposite points whose spacing is established by the transverse dimensions of the projection, and whose direct apposition is promoted by said flatness of said base portion.

9. A semi-conductor translator including a body of semi-conductive material having a base portion and a projection extending integrally from said base portion between laterally extending surfaces, and a pair of whiskers pressed against said body at opposite sides of said projection at the base thereof.

10. A semi-conductor translator including a body of semi-conductive material having spaced reliefs defining an upstanding septum between laterally extending surfaces, and point-contact elements engaging opposite sides of said septum at the junction thereof with the laterally extending surfaces.

11. A semiconductor translator including a body of semiconductive material having a base contact, an additional contact engaging said body at a certain position, an inside corner formed in said body at a predetermined distance from said additional contact and a further contact thrust against said inside corner.

References Cited in the file of this patent

UNITED STATES PATENTS

| | | |
|---|---|---|
| 2,563,503 | Wallace | Aug. 7, 1951 |
| 2,563,504 | Pfann | Aug. 7, 1951 |
| 2,569,347 | Shockley | Sept. 25, 1951 |